Sept. 10, 1929.   S. R. MITCHELL   1,727,481
METHOD AND APPARATUS FOR PROTECTION AGAINST COLD
Original Filed Aug. 19, 1925   2 Sheets-Sheet 2
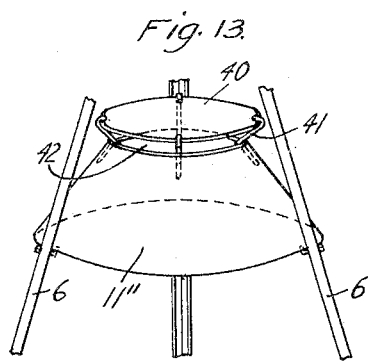
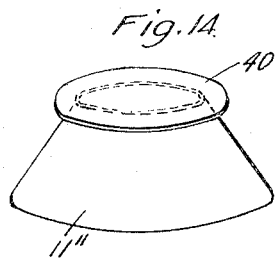
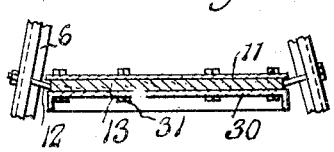
INVENTOR.
Singleton R. Mitchell
BY Arthur P. Knight
ATTORNEY.

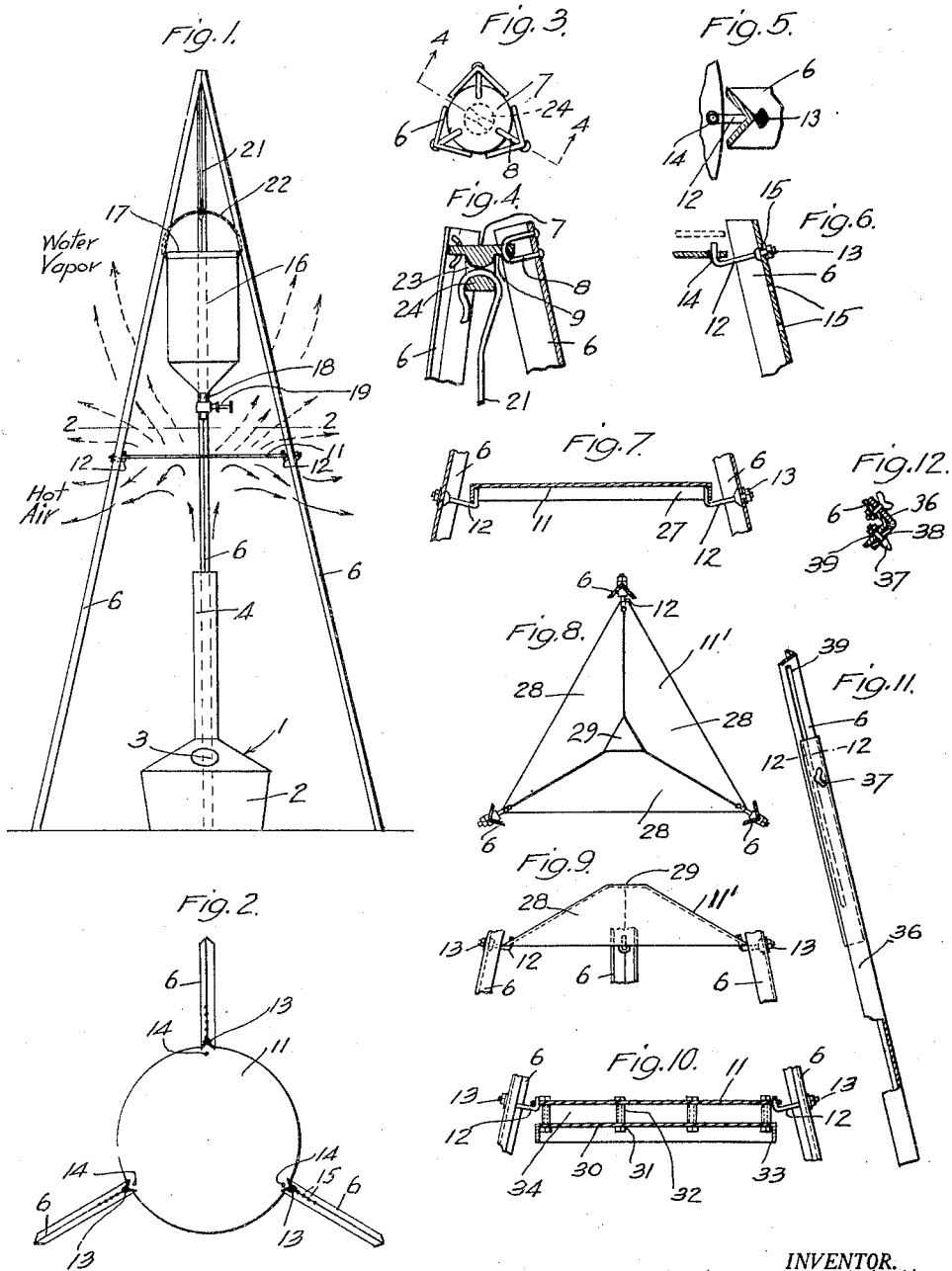

Patented Sept. 10, 1929.

1,727,481

UNITED STATES PATENT OFFICE.

SINGLETON R. MITCHELL, OF LONG BEACH, CALIFORNIA.

METHOD AND APPARATUS FOR PROTECTION AGAINST COLD.

Application filed August 19, 1925, Serial No. 51,151. Renewed February 18, 1929.

This invention relates to the development of heat for protection against cold and particularly for the protection of a region, for example a region containing citrus trees or other sensitive plants, against freezing during cold weather. The main object of this invention is to provide for the development and distribution of heat for this purpose in a more efficient manner than has heretofore been possible, thereby decreasing the number of heating units required to protect a certain region, for example a region containing a definite number of trees or plants, and also decreasing the fuel consumption and in general rendering the protection against freezing more economical.

My invention may advantageously be carried out in conjunction with almost any of the type of orchard heaters or smudge pots commonly employed for the above purposes and when so carried out it comprises essentially the method of heat production consisting of utilizing the hot air and combustion products from such an orchard heater or other simple heating device to vaporize water and form steam and causing such steam to be distributed laterally and to rise and recondense at a higher level and over a distributed area upon contact with colder air, while at the same time producing a more effective distribution of the hot air and combustion products themselves. My invention further comprises an apparatus for carrying out the above described method, said apparatus comprising essentially a vaporizing plate suspended above an orchard heater or other heating device so as to be heated thereby, and water storage means provided with drip means for continually and slowly supplying water, preferably drop by drop, onto said vaporizing plate, together with means for supporting said vaporizing plate and the water storage and drip means.

In addition to the general objects above set forth my invention has as its further and more particular objects the more effective distribution of the hot air and products of combustion themselves among the trees or plants to be protected, accompanied by an induced lateral distribution of the steam produced, the formation of a blanket of mist by the condensing steam which assists in retaining the heat within the orchard and retards radiation of such heat to the colder air above, and the utilization of the heat directly above the heater to convert water into steam followed by the subsequent liberation of such heat upon recondensation of such steam, such subsequent condensation and liberation of heat taking place over a widely distributed area, and within a limited distance from the ground, so as to most effectively retain and utilize the heat.

The accompanying drawings illustrate embodiments of my invention and referring thereto:

Fig. 1 is a side elevation of an apparatus suitable for carrying out my invention.

Fig. 2 is a horizontal section on line 2—2 in Fig. 1.

Fig. 3 is a plan view of the head of the supporting tripod shown in Fig. 1.

Fig. 4 is a vertical section on line 4—4 in Fig. 3.

Fig. 5 is a horizontal section through one leg of the supporting tripod just above the vaporizing plate, showing a portion of such plate and the method of securing the same to the tripod.

Fig. 6 is a vertical section of the parts shown in Fig. 5.

Fig. 7 is a vertical section of a modified form of vaporizing plate and the adjacent portions of two of the legs of the supporting tripod.

Fig. 8 is a plan view of another modified form of vaporizing plate with the supporting means shown in section.

Fig. 9 is a side elevation of the parts shown in Fig. 8.

Figs. 10 and 10ª are views similar to Fig. 7 showing further modifications in the construction of the vaporizing plate.

Fig. 11 is a partial side elevation of an extensible tripod leg for use in connection with my invention.

Fig. 12 is a horizontal section on line 12—12 in Fig. 11.

Figs. 13 and 14 are views showing other modifications of the vaporizing means.

The heater indicated at 1 may be of any suitable or well-known type of orchard heater or smudge pot commonly employed and may comprise a pot or receptacle 2 adapted to receive the oil or other fuel to be burned, opening means 3 for introduction of fuel, and insertion of a torch or other lighting means to ignite such fuel and for the admission of air to support combustion, and stack means 4 for conducting away the hot products of combustion and for producing a sufficient draft in the heater. My invention comprises, in connection with such orchard heater, a suitable supporting frame which may be of any desired construction and which I have indicated as comprising a tripod having legs 6, resting upon the ground adjacent the heater and joined together at their upper ends. Said legs may be connected together at their upper ends in any suitable manner but I prefer to provide non-rigid means for this purpose so that when not in use the apparatus may be dismantled and the tripod collapsed. For this purpose a disc-shaped head member 7 may be provided to which the respective legs 6 may be nonrigidly connected for example by means of U-bolts 8 secured to said legs and passing through holes 9 in said head member. I have shown the legs 6 as comprising angle irons and while this provides a very strong and rigid construction without excessive weight I may of course use any other type of structural members for this purpose.

Suitable vaporizing means, comprising for example a vaporizing plate 11, is mounted within the supporting frame at a suitable height above the outlet of stack 4, for example by means of hook bolts 12 secured to frame members 6 in any suitable manner, for example by nuts 13, and adapted to engage holes 14 in vaporizing plate 11. In order to provide for vertical adjustment of the vaporizing plate the leg members 6 may be provided with a plurality of holes 15 adapted to receive hook bolts 12 so that said bolts may be inserted in any one of said holes 15 so as to support plate at the desired level. The vaporizing plate 11 may comprise as shown in Figs. 1 and 2 a flat disc of iron or other metal and may be of any suitable thickness but should preferably be formed of such material and of such thickness as to satisfactorily resist the effect of the hot gases striking the same. At a suitable height above the vaporizing plate 11 is suspended a water storage receptacle 16 provided with a removable cover 17 and with an outlet pipe 18 at its lower end provided with a suitable valve 19 for regulating the outflow of water therethrough. Said receptacle may be supported in any suitable manner from the supporting frame means for example by means of a supporting hook 21 adapted to engage the handle 22 of said receptacle and to engage at its upper end an opening 23 in lug 24 formed on the head member 7.

In the operation of this form of the invention the apparatus is set up as shown with the vaporizing plate disposed at a suitable height above the heater. A supply of fuel is introduced into the heater and a supply of water into the storage receptacle 16. Since the operation of the device usually takes place during the night it is advantageous to supply the oil and water thereto during the day time, it being customary to make the fuel receptacle 2 of the heater sufficiently large to hold enough fuel to last throughout the night if necessary. I also prefer to make the storage receptacle 16 sufficiently large to hold enough water to last throughout the night and I have found that in certain cases a receptacle of two to four gallons capacity will be sufficient for this purpose. It will be understood of course that these heating devices will be distributed throughout the orchard or grove to be protected at sufficiently close intervals to provide for maintaining the necessary heating throughout the orchard. Inasmuch as the heat produced is utilized in a more efficient manner according to my invention than is the case when using the ordinary smudge pot alone it will not in general be necessary to provide as many of these heating devices as of such smudge pots when used alone.

As is customary in the ordinary methods of orchard heating when the temperature is expected to drop below that which is safe for the trees the temperature is carefully watched and when it falls below a certain point the operator takes a lighted torch and ignites the fuel in the heater, it being understood that either all or any desired proportion of the total number of heaters in the orchard may thus be ignited at one time. At the same time that the heater is started or slightly thereafter, when vaporizing plate 11 has become heated, the valve 19 is opened sufficiently to permit the desired rate of outflow of water from the receptacle 16 onto vaporizing means 11 and in order to provide for a slow consumption of the water and a slow rate of vaporization thereof I prefer to so adjust the valve 19 that the water is allowed to fall drop by drop at the desired rate upon such vaporizing plate. The hot air and combustion products produced in heater 1 rise and strike the under surface of the vaporizing means 11 and are reflected or deflected as indicated by the solid arrows in Fig. 1. The first effect of the device therefore is to spread the hot air and combustion products from the heater and to deflect the same toward the trees surrounding the heater instead of permitting them to pass straight upward and thus be largely wasted. Vaporizing means 11 is heated to a comparatively high temperature by such hot air and combustion products and the water falling thereon from receptacle 16 is converted almost at once into the form of steam which rises and at the same time spreads horizontally as indicated by the dotted arrows in Fig. 1 so as to be distributed laterally among and above the surrounding trees and above the hot air and combustion gases deflected from beneath the vaporizing means. The distribution of the steam laterally is caused by the laterally spreading current of hot air and combustion gases, which sets up an outward current away from the heater and thus sets up an induced outward current of the steam from above the vaporizing plate. The resulting ascending steam becomes thus distributed over a considerable area and upon coming into contact with cooler air is recondensed and liberates its latent heat of vaporization throughout the area over which it is distributed. It should be noted as a particular advantage of my invention that the heat of vaporization necessary to convert the water into steam is taken up at a point directly above the heater where there is an abundant supply of heat and is liberated throughout a relatively extended zone among or somewhat above the trees, in which zone said heat is most needed. The heat is thus distributed and liberated within a zone extending a limited distance above the ground so as to most effectively retain and utilize the heat. Furthermore the condensation of such steam forms a blanket or body of mist or condensed water particles within and above the orchard and thus materially retards the radiation of heat therefrom to the colder atmosphere above.

Many modifications may be made in the shape and disposition of the vaporizing means and my invention includes the use of any suitable device for this purpose. For example as shown in Fig. 7, said means may comprise a plate 11 provided with a downwardly projecting rim or flange 27 at its edge, in which case the hook bolts 12 may project under said flange and engage the under side of the plate 11. The object of the flange 27 is to further retard the direct upward flow of hot air and combustion products from the heater and to cause the same to be more effectively deflected downward and outward toward the trees or into the region surrounding the heater. Or as shown in Figs. 8 and 9 said vaporizing means may be formed as a pyramidal hood 11$^1$ having three sloping sides 28 and supported at its corners on hook bolts 12 connected as before to the supporting frame members 6. Such pyramidal hood may be provided with a flattened portion at the top as indicated at 29 which constitutes the vaporizing portion thereof and upon which the water from receptacle 16 drips and is vaporized. The effect of such a hood-shaped vaporizing means is similar to that of the flanged form above described in that it more effectively deflects the hot gases downward and outward and assists in their distribution among the trees and at the same time concentrates more heat at the vaporizing plate.

The vaporizing means may in other cases be formed as a conical or frusto-conical hood 11$^{11}$ as in Figs. 13 and 14, which may have a flat top or cover 40 constituting the vaporizing portion thereof. The hood in this case also serves to deflect the hot gases downward and outward and to concentrate the heat at the vaporizing plate 40. The vaporizing plate or cover 40 may either fit tightly against the top of hood 11 as in Fig. 14 or be raised slightly therefrom by suitable supports 41 as in Fig. 13 so as to permit any desired proportion of the hot gases to pass through the opening 42 between the hood and the vaporizing plate in order to give the most advantageous results. Instead of iron, any other suitable metal such as copper or brass may be used to form any of the above types of vaporizing means or a portion thereof, for example in the form last described, the plate 40 may be formed of copper or brass or any other suitable metal of sufficient heat conductivity and ability to withstand heating, and may be removably mounted on hood 11 so as to permit renewal or replacement thereof from time to time.

In some cases the use of a single vaporizing plate as in the forms above described may cause the air above the plate to be heated so rapidly that a strong upward current of hot air is thus produced, detracting to some extent from the beneficial effect of deflection of the hot gases and combustion products from their upward course and thus preventing the most effective lateral distribution of the hot air and steam. I may therefore prefer in some cases to provide a construction in which the transfer of heat to the upper or vaporizing surface of the vaporizing means and hence to the air above such means may be decreased to some extent. This effect may be accomplished for example by the construction shown in Fig. 10 in which the vaporizing means comprises a flat disc or vaporizing plate 11 supported on hook bolts 12 as before but is provided with a heating plate 30 suspended below and suitably spaced from the vaporizing plate 11, for example by means of bolts 31 and spacers 32. Said heating plate 30 may if desired be provided with a downwardly projecting flange 33 at its edge. In the use of this type of vaporizing means the heating plate 30 is heated by the hot air and combustion products from the heater but the layer of air indicated at 34 between such heating plate and vaporizing plate 11 retards to some extent the transmission of heat to the vaporizing plate. The rate of heating of such vaporizing plate may thus be controlled so as to provide for complete vaporization of water received thereon from the receptacle 16 while preventing too rapid heating of the air above the plate. Instead of depending solely upon the layer of air between the heating plate 30 and the vaporizing plate 11, a layer of any other material of less heat conductivity than said plate, for example a suitable solid heat insulating material such as asbestos or diatromaceous earth may be inserted between said plate, as indicated at 34¹ in Fig. 10ª, said insulating layer being of any suitable thickness to give the desired rate of heating of vaporizing plate 11.

In order to accommodate the apparatus to use with orchard heaters of different sizes I may in some cases provide for adjustment of the length of the supporting legs 6, in addition to the means for adjusting the point of support of the vaporizing means on said legs. For example as shown in Figs. 11 and 12 each supporting leg 6 may be provided with an extension portion 36 at its lower end, said extension portion being adjustably secured to the leg 6 in any suitable manner for example by means of bolts 37 passing through holes 38 in the extension portion 36 and adapted to engage in vertical slots 39 in the leg. In this manner the extension portion 36 may be adjusted so as to protrude to any desired extent below the bottom of leg 6 so as to provide for adjustment of the height of the supporting frame and hence of the height of the vaporizing means above the top of heater 1.

It will be understood of course that while I have described my invention for use in connection with an orchard heater, it may be applied in connection with any simple heating device, and may be used for the protection of any region against cold for any purpose whatever. By means of such method of heat conservation and distribution, a given number of orchard heaters is enabled to more effectively and uniformly heat the region in which they are placed, and the protection against the harmful effects of freezing, for example in the case of citrus fruits, is thus rendered much more certain and complete. Or from another point of view, a smaller number of orchard heaters may be made to effectively protect a given region, together with a corresponding reduction in fuel consumption and in the labor of lighting and maintaining the fires in the heaters, and the cost of protection against freezing may thus be reduced.

I claim:

1. The method of protecting a region against cold which comprises producing a body of hot air and combustion gases by the combustion of fuel at a point within such region, utilizing a portion of the heat from such hot air and combustion gases to vaporize water and form steam, distributing such hot air and combustion gases laterally in said region and also distributing the steam laterally in said region above the zone of lateral distribution of the combustion gases and separately from such hot air and combustion gases.

2. The method of protecting a region against cold which comprises forming a body of hot air and combustion gases by the combustion of fuel at a point within said region, utilizing a portion of the heat from said hot air and combustion gases to vaporize water and form steam, causing such hot air and combustion gases after giving up such portion of their heat to be distributed laterally in said region, and also causing said steam to be distributed laterally over said region and above said hot air and combustion gases and to rise and recondense upon contact with colder air so as to form a protective body of condensed water particles over said region.

3. An apparatus for protection against cold comprising, in combination with a heater, vaporizing means suspended above said heater and adapted to be heated thereby and comprising a substantially impervious plate having a flat portion extending in a substantially horizontal plane, a water receptacle suspended above said vaporizing means and adapted to deliver water onto said flat portion of said vaporizing means, the spaces above and below said plate being unobstructed laterally to permit free lateral distribution of the vapor above and the combustion gases below said plate, and supporting frame means for suspending said water receptacle and said vaporizing means in said position.

4. An apparatus as set forth in claim 3, said vaporizing means being mounted for vertical adjustment on said supporting frame means.

5. An apparatus as set forth in claim 3, said vaporizing means comprising a horizontally extending plate member provided with a downwardly projecting flange extending around its outer edge.

6. An apparatus for protection against cold comprising, in combination with a heater, a vaporizing plate suspended above said heater and being substantially impervious and having its outer edge substantially free so as to deflect laterally the hot air and combustion products from said heater and to receive heat therefrom, a water receptacle suspended above said vaporizing plate and adapted to deliver water thereto, and supporting frame means connected to said vaporizing plate and to said water receptacle to hold the same in their proper positions.

7. In an apparatus for protection against cold, a supporting frame, vaporizing means comprising an impervious plate connected to said supporting frame and suspended substantially horizontally at a distance above the bottom thereof, and a liquid receptacle connected to said supporting frame and suspended above said vaporizing means, said liquid receptacle having drip means for delivering water onto said impervious plate, said plate being unobstructed at its edges to permit free lateral distribution of vapor in a zone above the plate, and free lateral distribution of combustion gases in a zone below the plate.

8. An apparatus for protection against cold comprising, in combination with a heater, vaporizing means suspended above said heater and adapted to be heated thereby and comprising a heating plate and a vaporizing plate above said heating plate, said heating and vaporizing plates being separated by a layer of material of less heat conductivity than said plates, a water receptacle suspended above said vaporizing means and adapted to deliver water on to said vaporizing plate, and supporting frame means for suspending said water receptacle and said vaporizing means in said positions.

In testimony whereof I have hereunto subscribed my name this 1st day of August, 1925.

SINGLETON R. MITCHELL.